United States Patent [19]

Heidorn

[11] B 3,924,417
[45] Dec. 9, 1975

[54] VEHICLE AIR CONDITIONING CONTROL

[75] Inventor: John Henry Heidorn, Dayton, Ohio

[73] Assignee: General Motors Corporation, Detroit, Mich.

[22] Filed: Mar. 13, 1974

[21] Appl. No.: 450,546

[44] Published under the Trial Voluntary Protest Program on January 28, 1975 as document no. B 450,546.

[52] U.S. Cl. .................................. 62/158; 62/217
[51] Int. Cl.² ..................................... F25B 41/04
[58] Field of Search ............. 62/157, 158, 217, 214, 62/209

[56] References Cited
UNITED STATES PATENTS

| | | | |
|---|---|---|---|
| 2,273,535 | 2/1942 | Poe | 62/217 |
| 3,435,626 | 4/1969 | Wile | 62/217 |
| 3,525,234 | 8/1970 | Widdowson | 62/217 |
| 3,564,865 | 2/1971 | Spencer | 62/217 |
| 3,633,380 | 1/1972 | Pellizzetti | 62/217 |

Primary Examiner—W. F. O'Dea
Attorney, Agent, or Firm—Charles R. Engle

[57] ABSTRACT

A throttle valve is positioned by a control valve, having predetermined biasing characteristics, maintaining a desired evaporator control and inlet pressure to a compressor sufficient to prevent freezing in a vehicle air conditioning evaporator. A compressor discharge pressure responsive plunger changes the biasing characteristics of the control valve with increases in compressor discharge pressures lowering the control pressure as the throttle valve opens permitting greater flow to the compressor. This permits increases in cooling capacity with increases in load on the air conditioning system as indicated by increases in compressor discharge pressure. An electrical coil is provided concentrically around the compressor discharge pressure responsive plunger and is connected in an electrical circuit which may either be manually or automatically closed opening the control valve for a predetermined time period likewise lowering the control pressure for increased cooling. The electrical control of the plunger has particular application to cooling a warm vehicle passenger compartment during initial occupancy.

5 Claims, 7 Drawing Figures

VEHICLE AIR CONDITIONING CONTROL

This invention relates to a throttled vehicle air conditioning system and more specifically to such a system utilizing compressor discharge pressure to change the bias on a control valve and also including an electrical override permitting maximum cooling for a limited time period.

More efficient operation of a throttled air conditioning system may be obtained by decreasing the refrigerant pressure in the evaporator below the freeze value as the heat load on the evaporator increases. This is because the increased heat transfer between the air flowing through the evaporator and the refrigerant produces a temperature gradient between the evaporator fins and the fluid carrying tubes of the evaporator. Since frost accumulation on the fins is critical rather than that on the tubes, the refrigerant temperatures in the evaporator tubes may drop below freezing while the relative warm air passing through the evaporator maintains the fin temperature above freezing for a limited time period, the time period of course being of longer duration during higher ambient temperature operation.

It has been observed that the discharge pressure at the compressor outlet increaases in a manner somewhat proportionally with increases in ambient temperature. Therefore, as the ambient temperature of the air flowing through the evaporator increases, the compressor discharge pressure also increases. The present invention utilizes a discharge pressure actuated control on the throttling valve to permit refrigerant temperature in the evaporator to drop below the normal freeze level as this discharge pressure increases. The decreasing refrigerant pressure in the evaporator as the compressor discharge pressure increases closely follows the freeze characteristics of the evaporator and permits more efficient use of low evaporator pressures as the ambient temperature and the heat load increases. Additionally, the present invention utilizes either an automatic electrical control or a manually actuated switch in a control circuit to energize a solenoid coil reciprocating an armature engaging the control valve opening it so as to obtain maximum evaporator capacity for a limited time period such as during the initial occupancy of a vehicle. In this manner the system is effective to rapidly cool the passenger compartment prior to freeze conditions developing in the evaporator.

The improved vehicle air conditioning control system of my invention includes a throttling valve regulating flow through a throttling port in the compressor inlet so as to maintain a constant control pressure in the evaporator of the air conditioning system. A control valve is positioned downstream of the throttle valve and regulates flow of compressor inlet fluid through a bleed port wherein a spring biased evacuated bellows senses the compressor inlet pressure. Changes in compressor inlet pressure result in movement of the control valve in the bleed port thereby varying the pressure drop across the throttle valve permitting it to open and close the throttle port automatically maintaining the compressor inlet pressure constant.

An increase in compressor discharge pressure biases the plunger against the control valve assisting the bellows in opening the control valve. This lowers the control point at which the bellows open thereby lowering the pressure maintained in the evaporator. This increases flow through the evaporator and consequently to the compressor inlet so that the air conditioning system operates at a high cooling capacity with increases in compressor discharge pressures. As aforementioned the compressor discharge pressures are indicative of increased air conditioning system loading conditions such as by increased ambient temperatures. The control system of my invention further includes the provision of an electrical circuit including a solenoid coil actuating the compressor discharge pressure responsive plunger so that the control valve may be selectively electrically opened to provide maximum cooling capacity of the vehicle air conditioning system for limited time periods.

A primary object of the present invention is the provision of an automatic control for a vehicle air conditioning system including an evaporator pressure responsive control valve regulating the pressure drop across a throttle valve maintaining a predetermined control pressure in the system preventing evaporator freezing, a compressor discharge pressure responsive member charging the control pressure as ambient temperatures increase and electrical means actuating the compressor discharge responsive member opening the control valve for a predetermined time period.

Another object of the present invention is the provision of an automatic control for a vehicle air conditioning system including an evaporator pressure responsive control valve maintaining a desired control pressure in the evaporator by positioning a throttle valve regulating inlet flow to a compressor, a compressor discharge pressure responsive plunger biasing the control valve and consequently the throttle valve increasing inlet flow to the compressor with increases in system loading, and electrical means selectively energized to actuate the plunger opening the control valve increasing the system cooling capacity.

Another object of the present invention is the provision of a control valve serially aligned with a throttle valve controlling the inlet to a vehicle air conditioning compressor, the control valve being electrically controlled so that it can be selectively opened for a predetermined time period providing for maximum cooling of an air conditioning system by changing the pressure drop across the throttle valve opening the compressor inlet cooling the vehicle compartment during initial occupancy, the electrical controls being timed so that maximum cooling occurs for a period sufficiently long to cool the vehicle compartment while being sufficiently short to prevent evaporator freezing.

The novel features which I believe to be characteristic of my invention are set forth with particularity in the appended claims. My invention itself, however, both as to its organization and method of operation may best be understood by reference to the following description taken in connection with the accompanying drawings in which:

The present invention is an improvement over that shown in my issued U.S. Pat. No. 3,783,634 filed Sept. 14, 1972 entitled Head Pressure Biased Control Valve and assigned to a common assignee.

Figure 1:
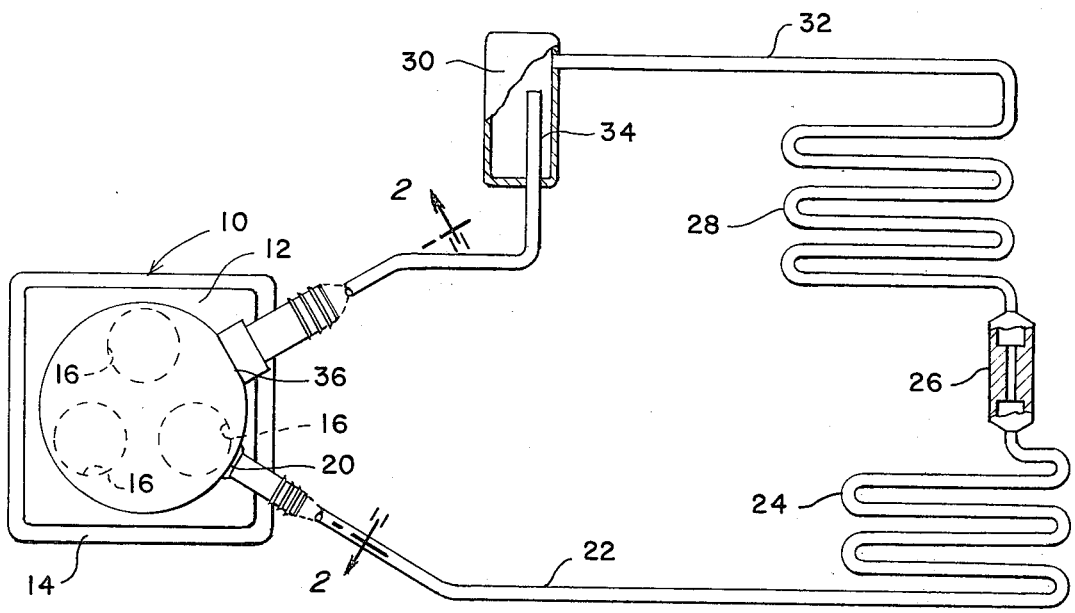
FIG. 1 is a diagrammatic view of a vehicle air conditioning system showing the compressor, control valve and throttling valve assembly of ny invention in an end view.

Referring now to FIG. 1, an end view of an automotive refrigerant compressor 10 is shown including a housing 12 and an end cover 14. The compressor 10 is of the type including three cylinders 16 each containing double acting pistons 18 shown in FIG. 2. Refrigerant is compressed by the pistons 18 reciprocating within the cylinders 16 and is discharged through an outlet 20. The refrigerant then passes through a conduit 22 to a condenser 24. The refrigerant exits condenser 24 and passes through an expansion means 26 from which it is discharged into an evaporator 28 where it absorbs heat from air flowing into a vehicle passenger compartment. The refrigerant exits the evaporator 28 and flows into an accumulator 30 through a conduit 32. The accumulator collects any liquid refrigerant which may pass through the evaporator and contains an upwardly extending outlet 34 which picks up refrigerant vapor flowing through the conduit 32 and directs it to compressor inlet 36 as shown.

Figure 2:
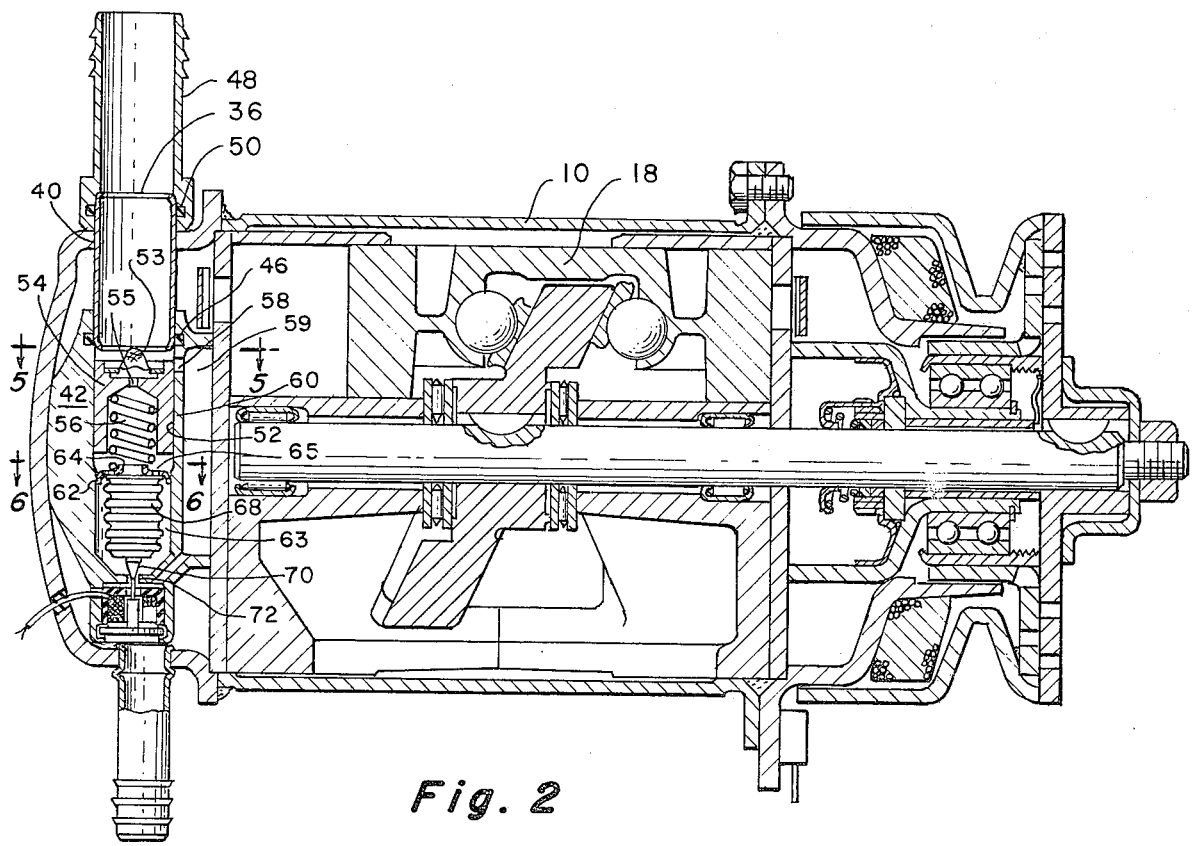
FIG. 2 is an enlarged sectional view of a vehicle air conditioning compressor illustrating the control valve and throttling valve assembly integral with the compressor assembly.

The refrigerant enters the compressor 10 through the inlet 36 as best shown in FIG. 2. Inlet 36 connects with a relatively short tube 40 sealed in a valve body member 42 via an O-ring 46. In a similar manner an inlet fitting 48 sealingly engages the short tube 40 by means of an O-ring seal 50.

Figure 5:
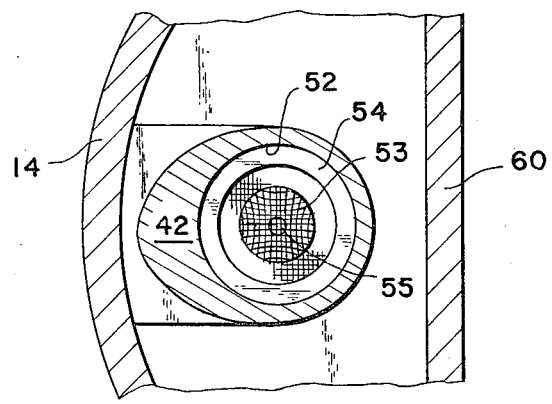
FIG. 5 is a cross sectional view taken on line 5—5 of FIG. 2.

The valve body member 42 contains a bore 52 extending laterally of compressor 10 and slidably receiving a throttle piston valve 54 biased by a spring 56 to a position normally closing a compressor inlet throttling port 58 formed in wall 60 of the valve body member 42, the throttling port connecting with a compressor inlet chamber 59. The throttle valve 54 has a screen 53 secured adjacent an orifice 55 preventing flow of foreign matter through the orifice downstream of the valve as is best shown in FIG. 2 and 5. The orifice 55 permits a build-up of evaporator and compressor inlet pressure downstream of valve 54.

Figure 6:
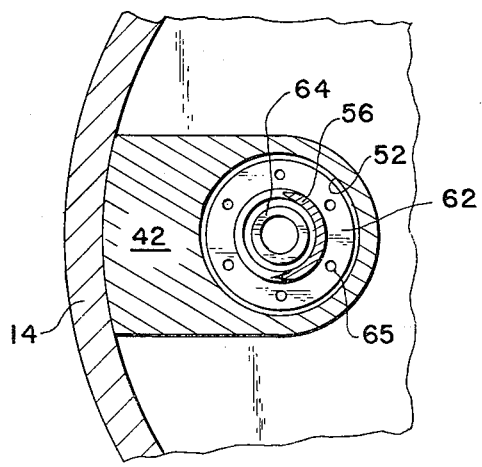
FIG. 6 is a cross sectional view taken on line 6—6 of FIG. 2.

The valve body member 42 has a bellows supporting plate 62 fixed in bore 52, the supporting member 62 containing a centrally upstanding flange 64 providing a seat for one end of a throttle valve biasing spring 56. An evacuated bellows assembly 68 containing a spring, not shown, is supported on the underneath side of the plate 62 in a control chamber 63 and has a needle control valve 70 affixed to the free end thereof. The plate 62 controls a plurality of apertures 65 permitting flow of refrigerant coming through orifice 55 to pass into control chamber 63, the apertures 65 being best shown in FIG. 6. The control valve 70 is tapered for selectively varying the flow of refrigerant through a bleed port 72 in the valve body member 42. The bleed port connects with compressor inlet chamber 59 via a passage 73.

Figure 3:
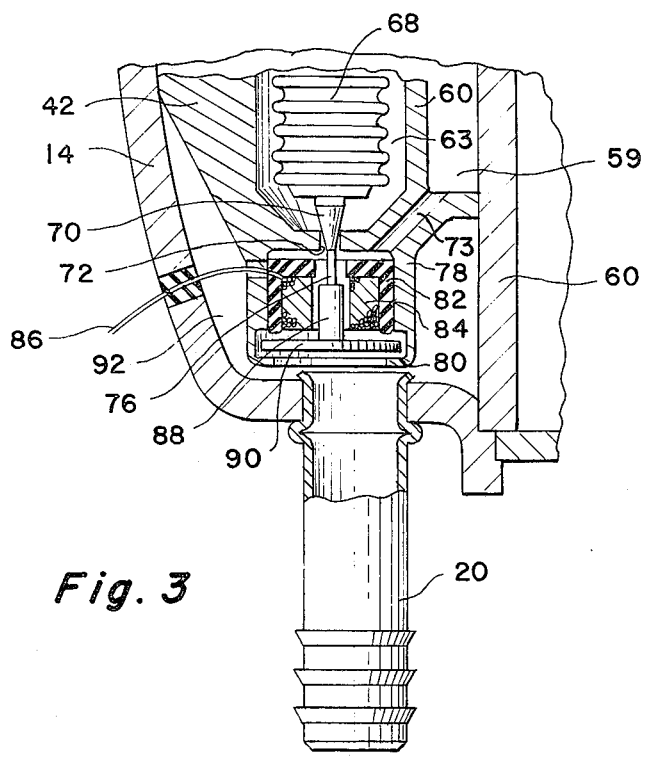
FIG. 3 is an enlarged fragmentary sectional view of the control valve in the control chamber in association with electrical actuating means in accordance with my invention.

The control valve 70 has a terminal end portion of reduced diameter 76 extending a predetermined distance through the bleed port 72 as is shown in FIG. 3.

The lower portion of the valve body member 42 is in the form of a cylinder 78 terminating in inturned flanges 80. The cylindrical portion 78 has a cup shaped member 82 press-fit therein, the cup shaped member containing a potted solenoid coil assembly 84 which is electrically connected with an external control through lead 86 to be later described in detail. A plunger armature 88 is positioned within the coil 84 for reciprocation therein in response to energization of the coil. The plunger armature 88 has a disk shaped head member 90 attached thereto which is exposed to the compressor discharge pressure prevailing in cavity 92 which is operative to bias the control valve 70 assisting the biasing forces of the bellows 68 and the pressure in control chamber 63 as will be described in connection with operation of my improved air conditioning control system.

Figure 4:
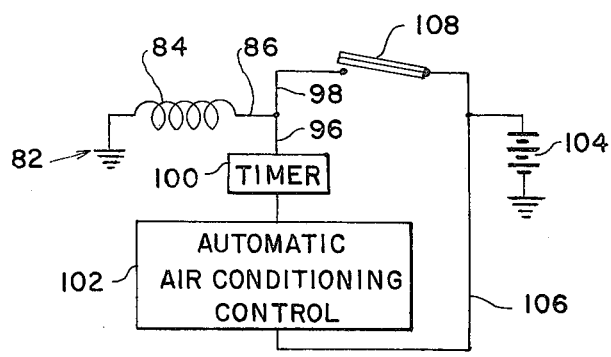
FIG. 4 is a schematic diagram of the electrical controls for selectively overriding the control valve.

With reference now to FIG. 4, the electrical lead 86 connected with solenoid actuating coil 84, which is operative to move the plunger 88 and open control valve 70 to provide maximum cooling capacity of the air conditioning system, is connected to a parallel circuit including electrical leads 96 and 98. The lead 96 connects with a timer 100 which in turn is in electrical circuit with an automatic air conditioning control unit 102 of the type conventionally used to provide a preset temperature within the vehicle compartment. The automatic control unit 102 is connected to a vehicle supported source 104 via a lead 106. The electrical lead 98 is connected to a source 106, which can be source 104 when both control circuits are used in the same vehicle, through a bimetallic switch 108. The switch 108 has predetermined temperature biasing characteristics such that manual closure of the switch 108 maintains the circuit closed energizing coil 84 for a predetermined period of time.

Figure 7:
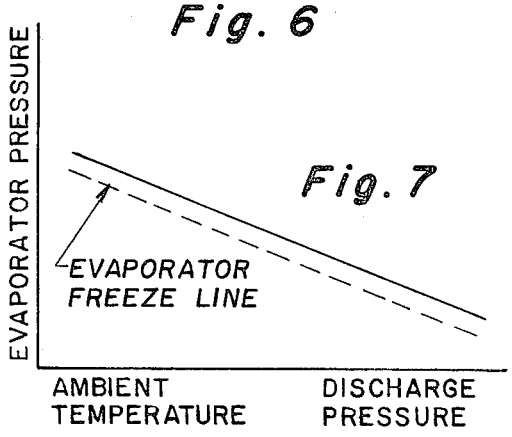
FIG. 7 is a graph showing the relationship between evaporator control pressure vs. ambient temperature and discharge pressure.

The combining of this circuitry into a conventional vehicle air conditioning system provides the feature of either automatically or manually energizing coil 84 for a predetermined time period moving plunger 88 against control valve 70 opening it against the biasing force of bellows 68. In this manner the throttle port 58 is opened placing the compressor in a maximum cooling capacity condition. The electrical control override feature can be utilized when the vehicle is initially occupied and the passenger compartment contains air at a relatively high temperature so that the air temperature across the evaporator is sufficiently high to permit maximum cooling of the air conditioning system without the evaporator air freezing. As shown in FIG. 7, the evaporator freeze line decreases with a decrease in either ambient temperature or compressor discharge pressure. Consequently, the evaporator can accommodate refrigerant at a pressure below the evaporator freeze line without freezing as a result of the flow of relatively warm air across its heat exchanging fins for a limited period of time. My invention takes advantage of this concept.

In operation of my improved vehicle air conditioning control, the disk 90 attached to the plunger 88 can be of a predetermined diameter so as to apply a specific bias to the control valve 70 when it is subjected to predetermined increases in compressor discharge pressure. The bias on the control valve 70 causes bellows 68 to open the valve at a lower evaporator pressure changing the control point in the system while the bias is applied. Consequently, the control pressure in the evaporator 28 decreases to a valve below that required to maintain it above the freeze line shown in FIG. 7. This results from the fact that flow through bleed port 72 exceeds that through orifice 55 when valve 70 is opened and the inlet fluid pressure moves valve 54 opening throttling port 58. As the evaporator control pressure decreases and the evaporator approaches a freezing condition, the compressor inlet pressure in chamber 63 also decreases permitting bellows 68 to move control valve 70 toward a closed position in bleed port 72. The throttle valve 54 then moves toward a throttle port 58 closed position. This reduces the cooling capacity of the compressor assembly 10 and consequently prevents freezing of the evaporator 28.

As has been previously described, the solenoid coil 84 is placed in an electrical control circuit whereby it can be energized for a predetermined time period moving plunger 88 against end portion 76 of control valve 70 likewise moving it to an open position out of bleed port 72. This also permits the compressor 10 to operate at maximum cooling capacity for a period sufficient to reduce the temperature in a vehicle passenger compartment when initially occupied, for example a period of 10 minutes, while operating under such conditions for a period sufficiently short to prevent freezing of evaporator 28.

While I have shown and described particular embodiments of my invention it will of course be under stood that various modifications and alternative constructions thereof may be made without departing from the true spirit and scope of my invention and that I intend by the appended claims to cover all such modifications and alternative constructions as fall within the true spirit and scope of my invention.

I claim:

1. A vehicle air conditioning system including a refrigerant compressor connected in series flow relation with a condenser, expansion means, and an evaporator; said compressor having a housing defining inlet and discharge passages; the system having an improved evaporator control assembly comprising: a valve body member exposed to both inlet and discharge refrigerant fluids in said housing; a throttle valve in said body member regulating flow of inlet fluids to said compressor through a throttle port; said throttle valve being exposed to inlet refrigerant fluids on one side; the other side partially defining a control chamber and being subjected to a control pressure therein; means normally biasing said throttle valve to a compressor closed inlet position; said valve body containing bleed port connecting said chamber with said inlet passage; a control valve in said control chamber movable in response to the pressure therein to open and close said bleed port changing the pressure differential across said throttle valve whereby it moves opening and closing said throttle port maintaining a predetermined desired control pressure in said chamber and in said evaporator preventing freezing of said evaporator during normal conditions; a pressure responsive control valve actuator plunger in said compressor discharge passages sensing refrigerant pressure increases in evaporator loading above the control pressure established by said control valve; an increase in evaporator loading reflected by an increase in compressor discharge pressure moving said plunger opening said control valve and lowering the control pressure in said control chamber; said throttle valve moving opening said throttling passage thereby increasing cooling capacity of the system while the discharge pressure remains above the predetermined control pressure; and electrical control means connected to said control valve being selectively operable to likewise open said control valve providing increased system cooling capacity as desired.

2. A vehicle air conditioning system having an improved evaporator control comprising: a refrigerant fluid compressor connected in series fluid flow relation with a condenser, an expansion means, and an evaporator; said compressor having a housing defining inlet and discharge passages; a valve body member containing a valve chamber being in fluid communication with said compressor inlet passage at one end and said compressor discharge passage at the other end; said valve body member having a throttling port in said valve chamber connecting with said compressor inlet passage providing for flow of refrigerant fluid from said evaporator to said compressor; a throttle valve in said valve chamber being subjected to the fluid in said compressor inlet passage on one side thereof; means on the other side of said valve biasing it toward a throttling port closed position whereby said valve is operative to regulate flow therethrough; said throttling valve dividing said valve chamber partially forming a control chamber on the opposite side of said valve from said compressor inlet passage; a bleed port in said valve body member connecting said control chamber with said compressor inlet passage; a control valve member positioned in said bleed port regulating flow therethrough from said compressor inlet passage in accordance with the pressure drop across said throttling valve; pressure responsive means actuating said control valve opening and closing said bleed port maintaining a predetermined control pressure in said control chamber and said evaporator as sensed by the pressure of refrigerant fluid in said compressor inlet passage; said predetermined control pressure in said evaporator determining the cooling capacity of said air conditioning system; a compressor discharge pressure responsive plunger in engagement with said control valve in said bleed port whereby said control valve is actuated in response to pressure discharge pressures which are indicative of air conditioning system loading so that said control valve is opened lowering the pressure drop across said throttle valve further opening said throttle port permitting said compressor to operate at a lower control pressure and a higher cooling capacity during high load conditions in the air conditioning system, said control valve and said compressor discharge responsive plunger both being effective to permit high cooling capacities without evaporator freezing; and electrical control means engaging said control valve and being selectively operable to likewise open said control valve providing increased system cooling capacity as desired.

3. A vehicle air conditioning system including a refrigerant compressor connected in series fluid flow relation with a condenser, an expansion means, and an evaporator; said compressor having a housing portion with inlet and outlet cavities therein; an inlet port connecting with said inlet cavity and receiving refrigerant from said evaporator; a discharge port in said housing in fluid connection with said discharge cavity supplying refrigerant under pressure through the system to said evaporator; a valve body in said compressor housing and being in fluid connection with said inlet cavity; a refrigerant throttling port in said valve body connecting said inlet port with said inlet cavity; a throttle valve regulating flow of refrigerant through said port; said throttle valve containing an orifice; one side of said throttle valve being exposed to refrigerant from said evaporator, the other side of said throttle valve partially defining an adjacent control chamber; a bellows support member secured in said control chamber; a spring engaging said bellows support member and said throttle valve normally biasing it toward a refrigerant throttling port closed position; said control chamber containing a bleed orifice; a tapered control valve positioned in said orifice, an evacuated bellows secured to said support member and being connected to said tapered control valve positioning said control valve in said orifice in response to pressure in said control chamber; said bellows support member containing apertures permitting flow of refrigerant through said throttle valve orifice and through the support member around said bellows; said bellows being designed to provide a predetermined control pressure in said air conditioning system; an increase in system pressure above said control pressure collapsing said bellows and moving said control valve open decreasing the pressure in said control chamber permitting movement of said throttle valve by the refrigerant under pressure from said evaporator opening said throttling port increasing inlet flow to said compressor whereby a greater volume flow of refrigerant is discharged from said compressor through said evaporator reducing the system control pressure until the predetermined control pressure is re-established; control valve actuating means in said compressor discharge cavity; said control valve actuating means responding to compressor discharge pressures reflecting increased evaporator loading, moving said control valve open permitting movement of said throttle valve opening said throttling port and increasing flow of refrigerant to said evaporator as evaporator load increases; an electrical means operably connected with said control valve actuating means whereby the control valve can be selectively opened to permit maximum capacity operation of the air conditioning system during predetermined conditions.

4. A vehicle air conditioning system having an improved evaporator control comprising: a refrigerant fluid compressor connected in series fluid flow relation with a condenser, an expansion means, and an evaporator; said compressor having a housing defining inlet and discharge passages; a valve body member containing a valve chamber being in fluid communication with said compressor inlet passage at one end and said compressor discharge passage at the other end; said valve body member having a throttling port in said valve chamber connecting with said compressor inlet passage providing for flow of refrigerant fluid from said evaporator to said compressor; a throttle valve in said valve chamber being subjected to the fluid in said compressor inlet passage on one side thereof; means on the other side of said valve biasing it toward a throttling port closed position whereby said valve is operative to regulate flow therethrough; said throttling valve dividing said valve chamber partially forming a control chamber on the opposite side of said valve from said compressor inlet passage; a bleed port in said valve body member connecting said control chamber with said compressor inlet passage; a control valve member positioned in said bleed port regulating flow therethrough from said compressor inlet passage in accordance with the pressure drop across said throttling valve; pressure responsive means actuating said control valve opening and closing said bleed port maintaining a predetermined control pressure in said control chamber and said evaporator as sensed by the pressure of refrigerant fluid in said compressor inlet passage; said predetermined control pressure in said evaporator determining the cooling capacity of said air conditioning system; a compressor discharge pressure responsive plunger in engagement with said control valve in said bleed port whereby said control valve is actuated in response to discharge pressures indicative of air conditioning system loading so that said control valve is opened lowering the pressure drop across said throttle valve further opening said throttle port permitting said compressor to operate at a lower control pressure and higher cooling capacity as the system cooling load increases; an electrical coil concentrically positioned around said compressor discharge pressure responsive plunger cooperating therewith forming a solenoid assembly; and an electrical control circuit means permitting timed manual energization of said coil actuating said plunger moving said control valve open permitting increased cooling capacity of the air conditioning system during initial occupancy of the vehicle; said control valve, said compressor discharge pressure responsive plunger and said circuit means permitting increased air conditioning system cooling capacity while preventing evaporator freeze-up.

5. A vehicle air conditioning system having an improved evaporator control comprising: a refrigerant fluid compressor connected in series fluid flow relation with a condenser, an expansion means, and an evaporator; said compressor having a housing defining inlet and discharge passages; a valve body member containing a valve chamber being in fluid communication with said compressor inlet passage at one end and said compressor discharge passage at the other end; said valve body member having a throttling port in said valve chamber connecting with said compressor inlet passage providing for flow of refrigerant fluid from said evaporator to said compressor; a throttle valve in said valve chamber being subjected to the fluid in said compressor inlet passage on one side thereof; means on the other side of said valve biasing it toward a throttling port closed position whereby said valve is operative to regulate flow therethrough; said throttling valve dividing said valve chamber partially forming a control chamber on the opposite side of said valve from said compressor inlet passage; a bleed port in said valve body member connecting said control chamber with said inlet passage; a control valve member positioned in said bleed port regulating flow therethrough from said compressor inlet passage in accordance with the pressure drop across said throttling valve; pressure responsive means actuating said control valve opening and closing said bleed port maintaining a predetermined control pressure in said control chamber and said evaporator as sensed by the pressure of refrigerant fluid in said compressor inlet passage; said predetermined control pressure in said evaporator determining the cooling capacity of said air conditioning system; a compressor discharge pressure responsive plunger in engagement with said control valve in said bleed port whereby said control valve is actuated in response to compressor discharge pressure indicative of air conditioning system loading so that said control valve is opened lowering the pressure drop across said throttle valve further opening said throttling port permitting said compressor to toperate at a lower control pressure and higher cooling capacity as the system cooling load increases; an electrical coil concentrically positioned around said compressor discharge pressure responsive plunger cooperating therewith forming a solenoid assembly; an automatic electrical control circuit including said solenoid assembly; and timing means in said electrical control circuit whereby energization of the air conditioning circuit during initial occupancy of the vehicle automatically energizes said coil for a predetermined time period permitting increased capacity of the compressor at a lower control pressure providing increased cooling capacity to the system for a time period sufficient to cool the vehicle passenger compartment while preventing evaporator freeze-up.

* * * * *